(12) United States Patent
Dyck (10) Patent No.: US 12,390,886 B2
(45) Date of Patent: Aug. 19, 2025

(54) DEVICE AND METHOD FOR GENERATING A PLURALITY OF GROOVES

(71) Applicant: 4JET MICROTECH GMBH, Alsdorf (DE)

(72) Inventor: Tobias Dyck, Aachen (DE)

(73) Assignee: 4JET MICROTECH GMBH, Alsdorf (DE)

( * ) Notice: Subject to any disclaimer, the term of this patent is extended or adjusted under 35 U.S.C. 154(b) by 913 days.

(21) Appl. No.: 17/437,814

(22) PCT Filed: Mar. 19, 2020

(86) PCT No.: PCT/EP2020/057615
§ 371 (c)(1),
(2) Date: Sep. 9, 2021

(87) PCT Pub. No.: WO2020/193366
PCT Pub. Date: Oct. 1, 2020

(65) Prior Publication Data
US 2022/0152741 A1    May 19, 2022

(30) Foreign Application Priority Data
Mar. 22, 2019    (DE) ............... 20 2019 101 652.3

(51) Int. Cl.
*B23K 26/364*    (2014.01)
*B23K 26/06*    (2014.01)
(Continued)

(52) U.S. Cl.
CPC ........ *B23K 26/364* (2015.10); *B23K 26/0643* (2013.01); *B23K 26/0648* (2013.01);
(Continued)

(58) Field of Classification Search
CPC .............. B23K 26/0604; B23K 26/067; B23K 26/073; B23K 26/352; B23K 26/364;
(Continued)

(56) References Cited

U.S. PATENT DOCUMENTS 5,073,007 A    12/1991    Kedmi et al.
5,237,149 A *  8/1993    Macken ............. B23K 26/0738
                                                219/121.75
(Continued)

FOREIGN PATENT DOCUMENTS

CN    100445776 A    12/2008
CN    107052574 A    8/2017
(Continued)

OTHER PUBLICATIONS

Kumkar, CN 107003531 A (Year: 2017).*
(Continued)

*Primary Examiner* — Vy T Nguyen
(74) *Attorney, Agent, or Firm* — Womble Bond Dickinson (US) LLP (57) ABSTRACT

A laser processing device for generating a plurality of grooves in a surface comprises an optical diffraction arrangement adapted to receive a laser radiation and to generate an output radiation hereupon, the output radiation having a plurality of intensity maxima. An actuator arrangement is provided for generating a relative movement between the output radiation and the surface, wherein each intensity maximum generates a groove of the plurality of grooves.

16 Claims, 2 Drawing Sheets

(51) Int. Cl.
*B23K 26/067* (2006.01)
*B23K 26/073* (2006.01)
*B23K 26/08* (2014.01)
*B23K 26/70* (2014.01)
*B23K 101/00* (2006.01)

(52) U.S. Cl.
CPC ...... *B23K 26/0676* (2013.01); *B23K 26/0736* (2013.01); *B23K 26/0869* (2013.01); *B23K 26/703* (2015.10); *B23K 2101/006* (2018.08)

(58) Field of Classification Search
CPC .............. B23K 26/042; B23K 26/0608; B23K 26/0613; B23K 26/064; B23K 26/0648; B23K 26/066; B23K 26/0676; B23K 26/355; B23K 26/36; B23K 2101/42; B23K 26/032; B23K 26/046; B23K 26/06; B23K 26/0622; B23K 26/0643; B23K 26/0665; B23K 26/0738; B23K 26/08; B23K 26/082; B23K 26/0821; B23K 26/356; B23K 26/3584; B23K 26/361; B23K 26/362; B23K 26/382; B23K 26/53; G02B 21/32; G02B 26/005; G02B 26/101; G02B 26/124; G02B 27/0927; G02B 27/0944; G02B 27/095; G02B 27/106; G02B 27/1073; G02B 27/1093; G02B 3/14; G02B 5/001; G02B 5/1871
USPC ............ 219/121.69, 121.75, 121.76, 121.61, 219/121.64, 121.65, 121.68, 121.72, 219/121.73, 121.8; 359/618, 629
See application file for complete search history.

(56) References Cited

U.S. PATENT DOCUMENTS

| | | | | |
|---|---|---|---|---|
| 6,120,725 | A * | 9/2000 | Asahi | B23K 26/364 219/121.75 |
| 2007/0054479 | A1* | 3/2007 | Tanaka | H01L 21/02686 257/E21.134 |
| 2016/0097885 | A1 | 4/2016 | Comstock, II et al. | |
| 2017/0136581 | A1 | 5/2017 | Izumi | |
| 2017/0144255 | A1 | 5/2017 | Song | |
| 2017/0182597 | A1* | 6/2017 | Abdou-Ahmed | G02B 5/1861 |

FOREIGN PATENT DOCUMENTS

| | | |
|---|---|---|
| DE | 103 28 314 A1 | 11/2004 |
| DE | 102014200633 B3 | 5/2015 |
| DE | 102018106579 A1 | 9/2019 |
| EP | 1 591 805 A1 | 11/2005 |
| EP | 3 170 743 A1 | 5/2017 |
| JP | H07-218709 A | 8/1995 |
| JP | H0890268 A | 4/1996 |
| JP | 2002-184690 A | 6/2002 |
| JP | 2006-068762 A | 3/2006 |
| JP | 2008-000800 A | 1/2008 |
| JP | 2008-049393 A | 3/2008 |
| JP | 2012-030267 A | 2/2012 |
| WO | 2011116968 A2 | 9/2011 |
| WO | WO 2016/012204 A1 | 1/2016 |
| WO | 2018/197555 A | 11/2018 |
| WO | WO 2018/197555 A1 | 11/2018 |

OTHER PUBLICATIONS

Chinese Office action for Application No. 202080021445.1, dated Mar. 11, 2023, 10 pages.
Japanese Office action for Application No. 2021-550017, dated Jul. 30, 2024, 8 pages.
Search report from the German Patent and Trademark Office for the priority application of the PCT/EP2020/057615, Nov. 16, 2021, 5 pages.
International Search Report of PCT/EP2020/057615, Jul. 2, 2020, 5 pages.
International Written Opinion of PCT/EP2020/057615, Jul. 2, 2020, 8 pages.
Ophir Optics, "CO2 Laser mirror—Beam Delivery Mirrors -Ophir", Apr. 16, 2018, URL:https://web.archive.org/web/20180416145230/ https://www.ophiropt.com/co2-lasers-optics/beam-delivery-mirrors, XP055706963, 2 pages.
Korean Office action for Application No. 10-2021-7033125, dated Aug. 1, 2024, 13 pages.
Japanese Office action for Application No. 2021-550017, dated Feb. 27, 2024, 9 pages.
European Office action for Application No. 20713262.2, Mar. 4, 2024, 5 pages.
Haupt, C., et al., Design of diffractive optical elements for CO2-laser material processing, Workshop on Digital Holography, SPIE vol. 1718, 1992, 6 pages. Retrieved at: https://elib.uni-stuttgart.de/bitstream/11682/4401/1/tiz113.pdf.
Japanese Office action for Application No. 2021-550017, dated Feb. 4, 2025, 7 pages.

* cited by examiner

DEVICE AND METHOD FOR GENERATING A PLURALITY OF GROOVES

This application is the U.S. national phase of International Application No. PCT/EP2020/057615 filed 19 Mar. 2020 which designated the U.S. and claims priority to German Utility Application No. 20 2019 101 652.3 filed 22 Mar. 2019, the entire contents of each of which are hereby incorporated herein by reference.

TECHNICAL FIELD

The subject matter disclosed herein relates to the field of laser processing of surfaces.

BACKGROUND

WO 2018/197555 A1 discloses a method and a device for producing riblets, wherein the riblets are introduced into a surface, in particular into a surface that has already been painted and cured, by means of laser interference patterning (DLIP—Direct Laser Interference Patterning). A component with riblets produced in this way enables to operate aircraft, ships and wind turbines with lower flow resistance.

SUMMARY

In view of the situation described above, there may be a need for a technique that enables laser processing of surfaces with improved characteristics.

This need may be met by the subject matter of the independent patent claims. Advantageous embodiments are indicated in the dependent patent claims.

According to the first aspect of the subject matter disclosed herein, a device is disclosed, in particular a laser processing device for generating a plurality of grooves in a surface.

According to embodiments of the first aspect, a laser processing device for generating a plurality of grooves (furrows) in a surface is disclosed, the laser processing device comprising: an optical diffraction arrangement adapted to receive a laser radiation and to generate an output radiation hereupon (thereon), the output radiation having a plurality of intensity maxima; and an actuator arrangement for generating a relative movement between the output radiation and the surface, wherein each intensity maximum (of the plurality of intensity maxima) generates a (one) groove of the plurality of grooves.

According to a second aspect of the subject matter disclosed herein, a method is disclosed, in particular a method for generating a plurality of grooves in a surface.

According to embodiments of the second aspect, a method for generating a plurality of grooves in a surface is disclosed, the method comprising: directing a laser beam onto (at) an optical diffraction arrangement to generate an output radiation, the output radiation having a plurality of intensity maxima; directing the output radiation onto (at) the surface; and generating a relative movement between the output radiation and the surface, wherein each intensity maximum (of the plurality of intensity maxima) generates a (one) groove of the plurality of grooves.

Various aspects and embodiments of the subject matter disclosed herein are based on the idea that a laser processing of surfaces with improved characteristics can be provided by generating a plurality of intensity maxima from a laser beam (or the laser radiation) directly through (by) an optical diffraction arrangement (for example, a diffractive optical element or a plurality of phase plates) and using each intensity maximum of the plurality of intensity maxima to generate a (one) groove of the plurality of grooves.

According to embodiments of the first aspect, the laser processing device is configured to provide the functionality of one or more of the embodiments disclosed herein and/or to provide the functionality as required for one or more of the embodiments disclosed herein, in particular the embodiments of the first or second aspect.

According to embodiments of the second aspect, the method is configured for providing the functionality of one or more of the embodiments disclosed herein and/or for providing the functionality as required for one or more of the embodiments disclosed herein, in particular the embodiments of the first or second aspect.

Further advantages and features of the subject matter disclosed herein will be apparent from the following exemplary description of currently preferred embodiments, to which, however, the present disclosure is not limited. The individual figures of the drawings of this application are to be considered merely schematic and not necessarily to scale. Rather, relative dimensions and angles may not be shown to scale in order to illustrate some embodiments of the subject matter disclosed herein.

DESCRIPTION OF EXEMPLARY EMBODIMENTS

In the following, exemplary embodiments of the subject matter disclosed herein are described, with reference to, for example, a laser processing device or a method. It should be emphasized that, of course, any combination of features of different aspects, embodiments and examples is possible. In particular, some embodiments are described with reference to a method, while other embodiments are described with reference to a laser processing device. However, it will be understood by a person skilled in the art from the foregoing and subsequent description, claims, and drawings that, unless otherwise indicated, features of different aspects, embodiments, and examples are combinable and such combinations of features are to be considered disclosed by this application. For example, even a feature relating to a method is combinable with a feature relating to a laser processing device, and vice versa. Furthermore, a feature of an embodiment relating to a laser processing device is combinable with a corresponding feature relating to a method. With the disclosure of a method, an embodiment of a method or a function, one or more elements (for example optical elements) and/or actuators (for example in the form of an actuator arrangement) as well as a functionality of a control device cooperating with the actuators are further to be regarded as disclosed, which are configured to execute the method or the function. Furthermore, with the disclosure of a function of a device, a corresponding method defining the function without device features is to be regarded as disclosed.

Unless otherwise specified, numerical values are to be understood including a ±5% window, i.e., for example, according to an embodiment, a number of 100 grooves comprises a number of grooves within an interval of (100±5%)=[95; 105], and according to an embodiment, a percentage of 50% comprises a percentage within an interval of 50%±5%=[47.5%; 52.5%]. According to another embodiment, numerical values are to be understood including a ±10% window.

According to an embodiment, a laser processing device is disclosed which is adapted to generate a plurality of grooves in a surface. According to another embodiment, the laser processing device comprises an optical diffraction arrangement adapted to receive a laser radiation and to generate an output radiation hereupon. According to another embodiment, the laser processing device comprises an actuator arrangement for generating a relative movement between the output radiation and the surface. Hereby, the output radiation generates (by removal of material from the surface) the plurality of grooves in the surface. According to an embodiment, the output radiation has a plurality of intensity maxima, each intensity maximum of which generates a groove of the plurality of grooves.

In accordance with embodiments of the subject matter disclosed herein, the laser processing device includes a beam path adapted to direct the output radiation onto the surface. For example, the beam path may be a free space in which the output radiation propagates from the diffraction arrangement towards the surface. According to another embodiment, the beam path may comprise one or more deflecting elements, for example mirrors. For example, the actuator arrangement may be adapted to move the at least one deflecting element and thereby to generate the relative movement between the output radiation and the surface. According to another embodiment, the actuator arrangement is adapted to move the surface and/or the laser processing device or parts thereof.

According to another embodiment, the beam path may include one or more focusing optical elements and/or one or more dispersing (diffusing) optical elements, such as optical lenses.

According to an embodiment, along the beam path, the plurality of intensity maxima exists only in a narrowly limited region of the beam path of the output radiation. It is understood that in this case the surface is positioned in this region of the beam path. In other words, according to an embodiment, the surface and the beam path are positioned with respect to each other such that the surface is located in a region of the beam path in which the output radiation has the plurality of intensity maxima.

Accordingly, according to an embodiment, a method for generating a plurality of grooves in a surface has one or more of the following embodiments. According to an embodiment, the method comprises directing a laser radiation onto an optical diffraction arrangement to generate an output radiation having a plurality of intensity maxima. According to another embodiment, the method comprises directing the output radiation onto the surface. According to another embodiment, the method comprises generating a relative movement between the output radiation and the surface (for example, the output radiation is generated during the relative movement). The plurality of grooves is generated by the relative movement between the output radiation and the surface, wherein each intensity maximum generates a groove of the plurality of grooves.

According to an embodiment, directing the output radiation onto the surface comprises positioning the surface and the output radiation with respect to each other so that the surface is in a region of the beam path in which the output radiation has the plurality of intensity maxima.

According to an embodiment, the optical element and/or the beam path and/or the actuator arrangement are adapted so that the plurality of grooves generated by the output radiation are parallel grooves.

According to an embodiment, a cross-sectional dimension (for example, a depth) of 80% of the grooves generated by the plurality of intensity maxima lies around a mean value of the cross-sectional dimension within a tolerance interval of ±10% of the cross-sectional dimension. According to an embodiment, the mean value here is the arithmetic mean over the relevant cross-sectional dimension of the plurality of grooves. According to an embodiment, the cross-sectional dimension may be a width of the grooves or a depth of the grooves.

According to an embodiment, the grooves in the surface form riblets, i.e. a structure which lowers a flow resistance of the surface compared to a smooth surface. In particular, with respect to the application, the function, the shape, the dimensions, the properties, etc. of the riblets, it is explicitly referred to WO 2018/197555 A1, the entire disclosure of which, in particular the dimensions and applications of the riblets, is incorporated herein by reference.

As it is usual for riblets, in an embodiment the grooves each have lateral walls. The adjacent walls of each two grooves arranged side by side therefore form two flanks of a rib (ridge) facing away from each other between the two grooves. In other words, according to an embodiment, a plurality of ribs is generated on the surface by the plurality of grooves, which ribs, when suitably dimensioned, act as riblets (i.e. reduce a flow resistance across the surface), for example as described in WO 2018/197555 A1 cited above. According to an embodiment, the flanks of the ribs include an acute angle. In particular, according to an embodiment, the ribs are tapered.

According to an embodiment, the ribs extend substantially parallel to each other and in particular parallel to a flow direction of an expected flow over (across) the surface.

According to an embodiment, the diffraction arrangement comprises at least one optical element. Where reference is made hereinafter to an optical element, it should be understood that according to an embodiment, in the case of two or more optical elements, each such optical element may be designed according to one or more of the embodiments disclosed herein.

According to an embodiment, the at least one optical element (for example, each optical element of the diffraction arrangement) is adapted to generate a plurality of phase differences between a plurality of portions of the output radiation. According to another embodiment, the at least one optical element is adapted to generate the plurality of intensity maxima in the output radiation by generating the plurality of phase differences. It is understood that the phase differences between each two portions of the output radiation are generally different for different portions of the output radiation.

For example, according to an embodiment, the optical element is a diffractive optical element. For example, according to an embodiment, the diffractive optical element has a structure that generates the plurality of phase differences. According to another embodiment, the diffraction arrangement comprises two or more diffractive optical elements. For example, in an embodiment, the diffraction arrangement comprises two or more (diffractive) optical elements (also referred to as phase masks, for example), whereby the generation of phase differences takes place in multiple planes (multi-plane light conversion, MPLC). According to another embodiment, the diffraction arrangement is a hologram. Based on a desired intensity distribution of the output radiation, a diffractive optical element, an MPLC element or a hologram may be manufactured according to manufacturing techniques known per se. Merely by way of example, the techniques described in the following documents may be mentioned: EP 1 591 805 B1, U.S. Pat. No. 5,073,007.

According to an embodiment, at least one of the at least one optical element of the diffraction arrangement is configured to generate the plurality of intensity maxima within a cross section of the output radiation that is smaller than the cross section of the laser radiation incident on(to) the diffraction arrangement. In other words, at least one of the at least one optical element of the diffraction arrangement is configured to achieve a focusing of the laser radiation as it falls on(to) the diffraction arrangement. For example, according to an embodiment, the last optical element (as seen in the direction of propagation of the laser radiation) of the diffraction arrangement (i.e., the optical element that generates the output radiation) is formed in this manner. According to an embodiment, the cross section (also referred to herein as the beam diagonal) is defined by the greatest extent of the radiation perpendicular to the direction of radiation.

Unless otherwise specified, the cross section of the output radiation refers to the cross section that the output radiation has on the surface. In other words, according to an embodiment, the cross section of the output radiation corresponds to the cross section of the entire illumination spot that the output radiation generates on the surface (i.e., at a defined distance from the diffraction arrangement). The spot (i.e., the entire illumination spot that the output radiation generates on the surface) therefore comprises the plurality of intensity maxima.

According to an embodiment, at least one further optical element, for example at least one focusing optical element and/or at least one dispersing optical element, for example a lens, etc., may be arranged between the diffraction arrangement and the surface (i.e. in the beam path). For example, the at least one further optical element may be provided for at least one of the following functions: to focus or expand (widen) the output radiation; to scale the plurality of intensity maxima; to generate the intensity maxima in a desired embodiment if the diffraction arrangement has been adapted for generating the plurality of intensity maxima in the desired embodiment with the at least one further optical element; etc. According to an embodiment, the diffraction arrangement is adapted (calculated) to generate, optionally taking into account the at least one further optical element, the plurality of intensity maxima (in particular the spot with the plurality of intensity maxima) at a predetermined distance. According to an embodiment, the surface is arranged at the predetermined distance from the diffraction arrangement.

According to an embodiment, the plurality of intensity maxima (i.e., the plurality of intensity maxima that each generate a groove of the plurality of grooves) comprises at least 10 intensity maxima. For example, the plurality of intensity maxima comprises at least 50 intensity maxima or, according to other embodiments, at least 100, at least 200, at least 500, or at least 1000 intensity maxima. For example, the plurality of intensity maxima comprises between 500 and 1500 intensity maxima.

According to an embodiment, the distance (spacing) of the intensity maxima is nominally between 40 µm and 160 µm, for example 100 µm. It is understood that if the grooves generate riblets in the surface, the distance of the intensity maxima is adjusted to achieve the desired distance of the ribs. As explained, the desired distance of the ribs (and thus the desired distance of the intensity maxima) may depend, for example, on the flow velocity for which the riblets produce a desired reduction of the flow resistance. It is understood that the distances of adjacent grooves of the plurality of grooves may in practice differ from the nominal distance of the intensity maxima, for example by ±5%. For example, according to an embodiment, for a nominal distance of intensity maxima of 100 µm, a distance of adjacent grooves may be between 90 µm and 110 µm.

According to an embodiment, the spot size is between 15 mm and 500 mm, for example between 30 mm and 200 mm. For example, for a 5 kW laser, the spot size may be 120 mm. Furthermore, for example, the spot size may be 70 mm, for example for a 2 kW laser. According to an embodiment, the spot has the spot size in a direction perpendicular to the relative movement.

According to an embodiment, the spot has a direction of minimum dimension and a direction of maximum dimension, wherein, according to an embodiment, the maximum dimension dmax is a multiple of the minimum dimension dmin. For example, the maximum dimension dmax is F times the minimum dimension dmin, dmax=F*dmin, wherein, according to an embodiment, the factor F is between 5 and 100, for example 40 (dmax=40*dmin). For example, the minimum dimension may be 3 mm and the maximum dimension may be 120 mm. For example, according to an embodiment, the spot is a substantially rectangular or elliptical spot with a dimension of dmin*dmax, i.e., for example, a dimension of 3 mm*120 mm. After the spot has the plurality of intensity maxima, the spot size (for example, of a "substantially rectangular" spot) denotes dimensions (for example, dmin, dmax) of a rectangle circumscribable around the spot (or around the plurality of intensity maxima). According to an embodiment, a spot size specified herein is the maximum dimension dmax of the spot.

According to an embodiment, the relative movement between the output radiation and the surface takes place in the direction of minimum dimension. Thus, a shorter illumination duration of the surface is realized by a smaller minimum dimension at a given speed of the relative movement. According to an embodiment, the illumination duration of the surface with the output radiation is less than 40 ms, for example less than 10 ms. In particular, the illumination duration of the surface with the output radiation is less than 2 ms.

According to an embodiment, the minimum dimension and the speed of the relative movement are adapted to realize the specified illumination duration. According to an embodiment, the speed of the relative movement is at least 100 mm/s, for example in an interval between 100 mm/s and 2 m/s, in particular in an interval between 300 mm/s and 1 m/s. For example, the speed of the relative movement is nominally 500 m/s or more.

According to an embodiment, the intensity maxima are arranged periodically, for example periodically in a row. According to an embodiment, each intensity maximum has a shape that deviates from a circular shape. For example, each intensity maximum of the plurality of intensity maxima has an elongated shape. Here, the shape of an intensity maximum is defined as usual, for example, by the shape of a line of equal intensity.

According to an embodiment, the optical element is adapted to operate in reflection. In other words, according to an embodiment, the optical element is a reflective optical element. By an optical element that operates in reflection, a thermal load on the optical element can be reduced. In an optical element operating in reflection, the structure generating the phase difference may be a surface structure according to an embodiment.

According to another embodiment, the optical element comprises a body made of metal or of a semiconductor material. According to an embodiment, the body is formed of a metal having high electrical conductivity and/or a metal having high thermal conductivity, for example copper or gold. According to another embodiment, the body is formed of a corrosion-resistant metal (i.e., a metal that is resistant to corrosion), for example, a suitable metal alloy or a noble metal. According to another embodiment, the body is formed of silicon. According to an embodiment, the body is formed of a single crystal. In this way, an influence of grain boundaries on the properties of the optical element may be avoided.

According to another embodiment, the body is at least partially coated with a metal, in particular a corrosion-resistant metal. According to an embodiment, the corrosion-resistant metal is a corrosion-resistant alloy or a noble metal, for example gold. The corrosion-resistant metal may permanently provide a high reflectivity of the optical element. For example, the optical element may have a body of silicon coated with the metal (for example, gold).

According to an embodiment, the body has a thickness in a range between 1 mm and 200 mm, for example between 5 mm and 50 mm. A larger thickness may allow a higher stiffness of the body and thus a higher accuracy of the optical element.

According to another embodiment, the optical element (for example, the body or, if a coating is disposed on the body, the coating) has a first surface with a cross section (for example, a diameter) in a range between 20 mm and 500 mm, for example, a diameter between 70 mm and 200 mm. According to an embodiment, the cross section (e.g., the diameter) is defined by the largest extent of the first surface (e.g., a main surface of the optical element).

According to an embodiment, the optical element is structured on the first surface, wherein, according to another embodiment, the structured surface is surrounded by a non-structured edge. According to an embodiment, the structured surface of the optical element may be formed by structuring the body (for example by engraving, etching, etc.), wherein a structure of the thus obtained body is transferred to the coating according to an embodiment and thus the coating (if present) has a corresponding structure (i.e. the structured surface of the optical element). According to an embodiment, the width of the non-structured edge is between 2% and 20% of the cross section of the first surface. According to an embodiment, the structured surface is fully illuminated by the laser radiation. To this end, according to an embodiment, the laser radiation can be expanded (broadened) accordingly, for example using a beam expander, for example in the form of a lens group or in the form of a DOE.

According to an embodiment, the laser processing device comprises a coolant flow path for cooling the optical diffraction arrangement (in particular for cooling the optical element), in particular a coolant flow path for a liquid coolant. For example, the optical element may comprise a cavity forming at least part of the coolant flow path. According to another embodiment, the coolant flow path may be formed by a separate component that is coupled to the optical element for heat transfer. According to an embodiment, the coolant flow path is arranged at a back side of the body, i.e., at a second surface (for example, a second main surface) of the body arranged facing away from the structured first surface.

According to an embodiment, the output radiation forms an angle between 0 degrees and 50 degrees with a (mean) surface normal of the structured (first) surface of the body, for example an angle of 10 degrees.

According to an embodiment, the laser radiation forms an angle between 1 degree and 70 degrees, for example between 45 degrees and 60 degrees, with the surface normal of the structured (first) surface of the optical element.

According to an embodiment, an angle between the laser radiation (i.e., an input radiation incident on(to) the diffraction arrangement) and the output radiation is between 20 degrees and 100 degrees, for example 50 degrees.

According to an embodiment, the optical element (in particular the last optical element of the optical diffraction arrangement in the direction of radiation) is calculated for a concrete arrangement of the optical components of the laser processing device and the surface (in particular for a concrete arrangement of the laser radiation, the optical element and the surface relative to each other). The calculation of the optical element for a concrete arrangement of the optical components of the laser processing device and the surface is particularly advantageous if the optical diffraction arrangement consists of a single diffractive optical element (DOE).

According to an embodiment, the laser radiation has a diffraction index (diffraction measure) $M^2$ that is smaller than 1.5 ($M^2<1.5$). According to another embodiment, the laser radiation has a diffraction index $M^2<1.3$ or $M^2<1.1$. The smaller the diffraction index, the more accurately a desired intensity pattern having the plurality of intensity maxima may be realized.

According to an embodiment, the laser radiation is the laser radiation of a CO2 laser. A CO2 laser has the advantage of being available with high average powers, which in turn enables high processing speeds. For example, an average power of the laser radiation is at least 500 watts (W). According to another embodiment, the average power of the laser radiation is at least 1 kilowatt (kW) or, according to yet another embodiment, at least 3 kW.

However, a high average power requires in return a suitable design of the laser processing device and its parts to allow a reliable and stable operation of the laser processing device. Embodiments of the subject matter disclosed herein allow a reliable and stable operation of the laser processing device at a high average power.

According to an embodiment, the laser processing device comprises a laser source for generating the laser radiation. According to another embodiment, however, it can also be provided that the laser processing device can be coupled to a laser source.

In summary, the present disclosure in particular comprises the following embodiments and combinations of embodiments:

1. A laser processing device for generating a plurality of grooves in a surface, the laser processing device comprising:
    an optical diffraction arrangement adapted to receive a laser radiation and to generate an output radiation hereupon (thereon, therefrom), the output radiation having a plurality of intensity maxima;

an actuator arrangement for generating a relative movement between the output radiation and the surface, wherein each intensity maximum generates a (one) groove of the plurality of grooves.

2. The laser processing device according to embodiment 1, wherein the diffraction arrangement comprises at least one optical element, in particular wherein the at least one optical element is adapted to generate a phase difference between a plurality of portions of the output radiation.

3. The laser processing device according to embodiment 2, wherein the at least one optical element is adapted to operate in reflection.

4. The laser processing device according to embodiment 2 or 3, wherein the at least one optical element comprises a body made of metal or a semiconductor material.

5. The laser processing device according to embodiment 4, wherein the body is at least partially coated with a metal, in particular a corrosion-resistant metal such as a corrosion-resistant alloy or a noble metal.

6. The laser processing device according to any one of the preceding embodiments, wherein the optical element is a diffractive optical element.

7. The laser processing device according to any one of the preceding embodiments, wherein the plurality of intensity maxima comprises at least 10 intensity maxima, in particular at least 50 intensity maxima or at least 200 intensity maxima.

8. The laser processing device according to any one of the preceding embodiments, further comprising:
    a beam path adapted to direct the output radiation onto (at) the surface;
    wherein the relative movement is a rectilinear movement; and
    the diffraction arrangement and/or the beam path are adapted such that each two grooves of the plurality of grooves form a rib therebetween.

9. The laser processing device according to any one of the preceding embodiments, wherein the laser radiation is a CO2 laser radiation.

10. The laser processing device according to any one of the preceding embodiments, wherein an average power of the laser radiation is at least 500 W, in particular at least 1 kW.

11. The laser processing device according to any one of the preceding embodiments, further comprising a laser source for generating the laser radiation.

12. The laser processing device according to any one of the preceding embodiments, further comprising a coolant flow path for cooling the optical diffraction arrangement, in particular comprising a coolant flow path for a liquid coolant.

13. A method of generating a plurality of grooves in a surface, the method comprising:
    directing a laser radiation onto (at) an optical diffraction arrangement to generate an output radiation, the output radiation having a plurality of intensity maxima;
    directing the output radiation onto (at) the surface; and
    generating a relative movement between the output radiation and the surface, wherein each intensity maximum generates a (one) groove of the plurality of grooves.

14. The method according to embodiment 13, wherein generating the output radiation comprises reflecting the laser radiation at (off) the optical diffraction arrangement.

15. The method according to any one of embodiments 13 or 14, wherein the plurality of intensity maxima comprises at least 10 intensity maxima.

16. Use of a laser processing device according to any one of embodiments 1 to 12 or a method according to any one of embodiments 13 to 15 for generating a plurality of parallel ribs, in particular riblets, on the surface.

Embodiments of the subject matter disclosed herein allow a free geometry selection (design) of the grooves or the ribs between the grooves (within the unit cell, i.e., for example, more pointed tips of the ribs, flatter bottom of the grooves). In contrast, classical interference processing allows only rips and grooves that are at least partially sinusoidal in shape.

Furthermore, embodiments of the subject matter disclosed herein allow for a more precise delimitation, in particular transverse to the processing direction, of the spot that the output radiation produces on the surface. This may allow a better apposition of processing traces of different spots transverse to the processing direction. In contrast, in classical interference with Gaussian beams, a Gaussian envelope is present. According to an embodiment, this envelope can be shaped into a rectangular function (or approximated to a rectangular function) with (by) the diffraction arrangement.

By the generation of the plurality of intensity maxima in the output radiation by an optical diffraction arrangement (according to an embodiment by a single optical element, in particular a single diffractive optical element), a considerable simplification may result in comparison to conventional interference structuring (which in particular comprises a beam splitting and a subsequent merging of the partial beams), since, according to embodiments of the subject matter disclosed herein, the beam shaping (the shaping of the envelope of the spot) and formation of the intensity maxima is effected by fewer optical elements (for example, only a single optical element).

In particular, the formation of the plurality of intensity maxima according to embodiments of the subject matter disclosed herein is not based on the generation of a path difference by individual optical elements positioned at a defined distance from each other—in contrast to conventional interference patterning. This results in a higher stability in an industrial environment, in particular because fewer optical elements have to be kept in a defined position with respect to each other.

DETAILED DESCRIPTION

In the following, exemplary embodiments of the subject matter disclosed herein are described with reference to the drawings. It is noted that in different figures similar or identical elements or components are sometimes provided with the same reference numbers, or with reference numbers differing only in the first digit. Features or components which are identical or at least functionally identical to the corresponding features or components in another figure are described in detail only on their first occurrence in the following text and the description is not repeated on subsequent occurrences of these features and components (or the corresponding reference numbers). According to an embodiment, the above definitions apply to subsequent embodiments, and vice versa. Furthermore, the features and embodiments described above can be combined with the features and embodiments described below.

Figure 1:
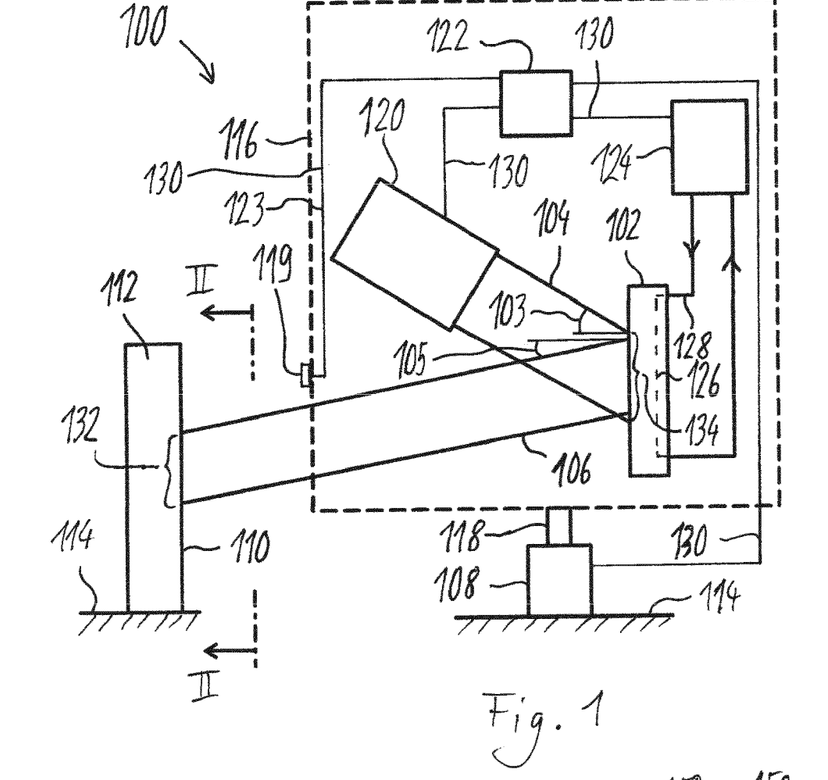
FIG. 1 schematically illustrates a laser processing device according to embodiments of the subject matter disclosed herein.

FIG. 1 schematically illustrates a laser processing device 100 according to embodiments of the subject matter disclosed herein.

According to an embodiment, the laser processing device 100 comprises an optical diffraction arrangement 102 adapted to receive a laser radiation 104 and to generate an output radiation 106 hereupon. According to an embodiment, the laser radiation 104 forms an angle 103 with a mean surface normal of the diffraction arrangement 102 that is between 1 degree and 70 degrees, for example an angle of 30 or 45 degrees. According to an embodiment, the direction of the surface normal is averaged over an active surface (for example, a patterned surface) of the diffraction arrangement 102, in particular (for example, if the diffraction arrangement 102 has more than one active surface) over an outer active surface of the diffraction arrangement 102 that is illuminated by the laser radiation 104. As a result, the surface normal is also referred to herein as the mean surface normal. According to an embodiment, the output radiation 106 forms an angle 105 with the mean surface normal that is between 0 degrees and 70 degrees, for example an angle of 30 or 45 degrees.

The laser processing device 100 further comprises an actuator arrangement 108 for generating a relative movement between the output radiation 106 and a surface 110 of an object 112. According to an embodiment, the actuator arrangement 108 is stationary, indicated at 114. According to another embodiment, a processing assembly 116 is coupled to the actuator arrangement 108 via a carrier 118. According to an embodiment, the actuator arrangement 108 and/or the carrier 118 is formed by a robotic arm. According to an embodiment, the actuator arrangement 108 and/or the carrier 118 may be on a movable lifting platform for rough positioning (not shown in FIG. 1). This may be particularly advantageous for large objects, such as aircraft parts. According to an embodiment, the lifting platform may comprise at least one actuator for moving the lifting platform. According to an embodiment, the at least one actuator for moving the lifting platform may be part of the actuator arrangement 108. By means of the actuator arrangement 108, the processing assembly 116 may be moved with respect to the object 112 or the surface 110 of the object 112 so as to move the output radiation 106 relative to the surface. According to another embodiment, it may be provided that the object 112 is movably arranged by means of an actuator arrangement, in addition or alternatively to the actuator arrangement 108.

A sensor arrangement 119 may be provided for maintaining a distance between the diffraction arrangement 102 and the surface 110 in a predetermined distance range and/or for maintaining an orientation between the diffraction arrangement 102 and the surface 110 in a predetermined orientation range (pivoting range). According to an embodiment, the sensor arrangement comprises one or more sensors, for example at least one of a position sensor, a distance sensor, etc.

According to an embodiment, the object 112 is, for example, a part of an aircraft, such as a wing or fuselage of the aircraft. According to another embodiment, the object 112 may be, for example, a rotor blade of a wind power plant. According to an embodiment, the object 112 is fixedly disposed (indicated at 114), for example on a carrier (not shown in FIG. 1).

According to an embodiment, the laser processing device 100 comprises a laser delivery device (laser emitting device) 120 for emitting the laser radiation 104. According to an embodiment, a laser source for generating the laser radiation is arranged in the laser delivery device 120. According to another embodiment, the laser source is arranged external to the laser delivery device 120. In particular, in an embodiment in which the laser processing device 100, or a part of the laser processing device 100, is moved by the actuator arrangement 108 with respect to the surface 110, for example as shown in FIG. 1, the arrangement of the laser source external to the laser processing device may be expedient (for example for weight reasons).

According to an embodiment, the laser processing device further comprises a cooling device 124 for supplying a coolant 128 to the optical diffraction arrangement 102 or a coolant flow path 126.

Furthermore, according to an embodiment, the laser processing device 100 comprises a control device 122 for controlling further components of the laser processing device, for example the laser delivery device 120, the cooling device 124 and/or the actuator arrangement 108. According to an embodiment, the further components are controlled by the control device 122 via a signal transmission coupling 130 of these further components to the control device 122, for example as shown in FIG. 1. According to an embodiment, the control device 122 is coupled to the sensor arrangement 119 by signal transmission (indicated at 130). According to another embodiment, the control device 122 is adapted to control one or more components of the laser processing device 100 in response to sensor signals 123 from the sensor arrangement 119. According to an embodiment, the control of components of the laser processing device (in particular the control of the further components and further in particular the control of the actuator arrangement) may be adapted to maintain the distance between the diffraction arrangement 102 and the surface 110 in a predetermined distance range and/or maintain an orientation between the diffraction arrangement 102 and the surface 110 in a predetermined orientation range. According to an embodiment, the laser delivery device is merely a passive element. In this case, signal transmission coupling with the control device may be omitted.

According to an embodiment, the processing assembly 116 comprises one or more of the following components: the laser delivery device 120, the control device 122, the cooling device 124, the optical diffraction arrangement 102, and the sensor arrangement 119. For example, the processing assembly 116 comprises all of these components, for example as indicated schematically by the dashed line at 116 in FIG. 1.

According to an embodiment, the output radiation has a plurality of intensity maxima (not shown in FIG. 1), wherein a cross section 132 of the output radiation 106, and in particular a cross section of the entirety of the plurality of intensity maxima, is smaller than the cross section 134 of the laser radiation 104 incident on the optical diffraction arrangement 102. For example, according to an embodiment, the optical diffraction arrangement 102 has a focusing effect and thus reduces the cross section of the laser radiation 104 from the cross section 134 of the laser radiation 104 at the diffraction arrangement 102 to the cross section 132 of the output radiation 106 at the surface 110. According to an embodiment, the cross section 132 is also referred to as the spot size of the output radiation 106. According to an embodiment, interference occurs in the output radiation 106, thereby forming the plurality of intensity maxima.

It is noted that in addition to the output radiation 106 having the plurality of intensity maxima, the diffraction arrangement 102 may also generate additional radiation not used for processing the surface 110. The unused radiation (not shown in FIG. 1) may be masked, for example, by suitable apertures so that it does not exit the laser processing device 100 or the processing assembly 116.

Figure 2:
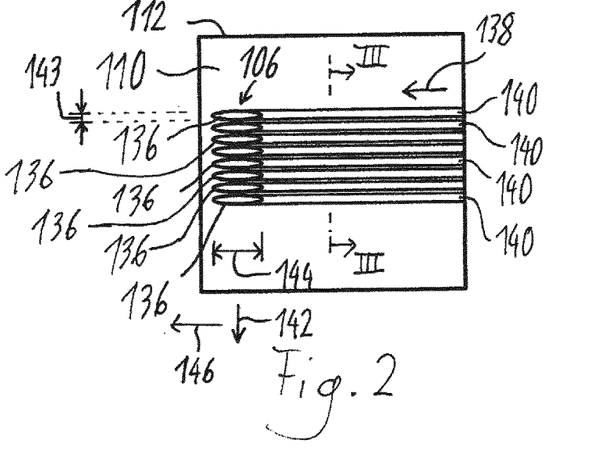
FIG. 2 shows the surface of the object in FIG. 1 as seen from the line II-II in FIG. 1.

FIG. 2 shows the surface 110 of the object 112 of FIG. 1 as seen from line II-II in FIG. 1.

According to an embodiment, the output radiation 106 has a plurality of intensity maxima, some of which are indicated at 136 in FIG. 2. By the relative movement of the surface and the output radiation, 106 indicated at 138 in FIG. 2, the intensity maxima 136 generate a plurality of parallel grooves in the surface, some of which are indicated at 140 in FIG. 2. The indicated direction 138 is the movement direction of the output radiation 106 across the surface 110.

According to an embodiment, the shape of the intensity maxima deviates from a circular shape. In particular, according to an embodiment, one of the intensity maxima along a first direction 142, along which the intensity maxima are arranged side by side according to an embodiment, has a first extent 143 that is smaller than a second extent 144 in a second direction 146, the second direction 146 being arranged perpendicular to the first direction 142. According to an embodiment, the relative movement 138 between the output radiation 106 and the surface 110 occurs along the second direction 146, for example as shown in FIG. 2.

According to an embodiment, the plurality of intensity maxima forms a spot of the output radiation or are formed by a spot of the output radiation. According to an embodiment, the spot has a minimum extent in the second direction 146 (i.e., in the longitudinal direction of the groove 140) and has a maximum extent perpendicular thereto (along the first direction 142). The greater the maximum extent of the spot in the first direction (perpendicular to the longitudinal direction of the grooves 140), the more grooves can be generated by the spot for a given groove width. The more grooves a spot generates, the higher a surface processing speed of the laser processing device 100 can be.

Figure 3:
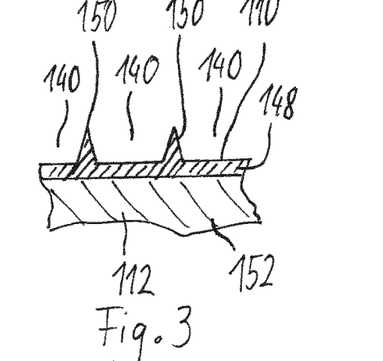
FIG. 3 shows a portion of the plurality of grooves in FIG. 2 in a cross-sectional view, along the line III-III in FIG. 2.

FIG. 3 shows a portion of the plurality of grooves 140 of FIG. 2 in a cross-sectional view, along the line III-III in FIG. 2.

According to an embodiment, the dimensions and distances of the grooves 140 are such that ribs 150 remain between the grooves 140. The ribs 150 are therefore formed of a material 148 that forms the surface 110 and that has been removed by irradiation with the output radiation 106 in the region of the grooves 140. According to an embodiment, the material 148 is a coating (for example, a varnish or lacquer) disposed on a base portion 152 of the object 112, for example as shown in FIG. 3.

Figure 4:
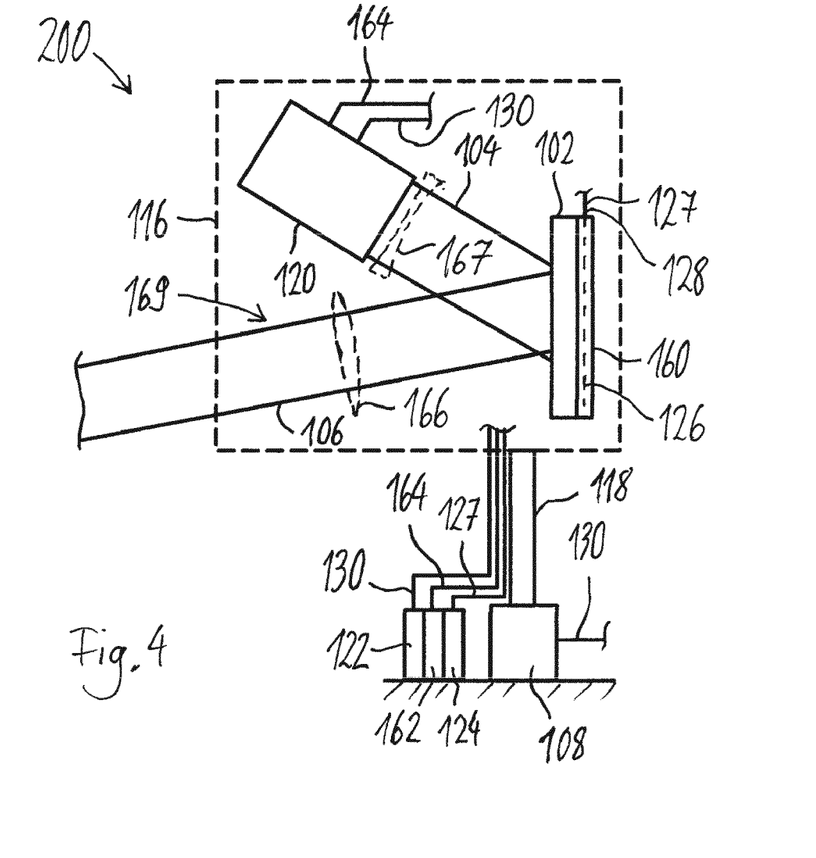
FIG. 4 illustrates a laser processing device according to embodiments of the subject matter disclosed herein.

FIG. 4 illustrates a laser processing device 200 according to embodiments of the subject matter disclosed herein.

According to an embodiment, the laser processing device 200 comprises a cooling device 124 for cooling the diffraction arrangement 102. According to an embodiment, the cooling device 124 is external to the processing assembly 116, for example as shown in FIG. 4. According to another embodiment, the laser processing device comprises coolant conduits 127 through which coolant 128 is conveyable to the diffraction arrangement 102. According to an embodiment, the laser processing device 200 comprises a heat exchanger 160 (for example, a heat sink) having a coolant flow path 126 through which coolant 128 flows and is in thermal contact with the diffraction arrangement 102 (for example, as shown in FIG. 4) to remove heat from the diffraction arrangement 102 with the coolant 128. According to an embodiment, the heated coolant 128 is returned to the cooling device 124 for cooling and again providing coolant to the diffraction arrangement.

According to an embodiment, the laser processing device 200 comprises a laser source 162 that generates and delivers (supplies) the laser radiation 104 via a suitable light guide path 164 to the laser delivery device 120 from which the laser radiation 104 is emitted to the diffraction arrangement 102, for example as shown in FIG. 4. According to an embodiment, the light guide path 164 comprises an optical fiber and/or a suitable mirror arrangement for delivering the laser radiation 104 to the laser delivery device 120. For example, in the case of high powers of the laser radiation 104 and/or high requirements for maintaining coherence of the radiation, a mirror arrangement may be preferred over an optical fiber. According to an embodiment, the laser source 162 is external to the processing assembly 116, for example as shown in FIG. 4.

According to an embodiment, the laser processing device 200 comprises one or more further optical elements 166, for example a focusing optical element 166 that focuses the output radiation 106 onto a surface (not shown in FIG. 4) and/or a beam-expanding optical element 167 that expands (widens) the laser radiation 104 to the desired cross section 134 (see FIG. 1), for example at positions such as those shown as dashed lines in FIG. 4.

The optical element 166 in FIG. 4 is an example of an optical element in a beam path 169 between the diffraction arrangement 102 and the surface on which the grooves are generated. For example, the optical element 166 may contribute to the beam path 169 being adapted to direct the output radiation 106 onto the surface. For example, the at least one optical element 166 (which is also referred to herein as another optical element) could be a mirror of a scanner that moves the output radiation across the surface. In this case, the actuator arrangement would comprise at least one actuator of the scanner. According to another embodiment, directing of the output radiation 106 onto the surface is performed solely by the diffraction arrangement 102. In other words, according to an embodiment, the beam path 169 is free of optical elements, for example, mirrors, lenses, etc.

According to an embodiment, the laser processing device 200 further comprises a control device 122 that is coupled to components of the laser processing device 200 by signal transmission (exemplified in FIG. 4 for some components indicated at 130).

According to an embodiment, the laser processing device 200 comprises an actuator arrangement 108 and a carrier 118. According to an embodiment, the actuator arrangement 108 and the carrier 118 form at least a portion of a robot arm. According to an embodiment, connection paths between external components of the laser processing device 200 (for example, the cooling device 124, the laser source 162, and the control device 122) and the movable components of the laser processing device (for example, the laser delivery device 120, the diffraction arrangement 102, and optional further optical elements 166, 167, in particular the components of the processing assembly 116) are guided on the carrier 118 and/or the actuator arrangement 108 (for example, on at least a part of the robot arm), for example as schematically shown in FIG. 4.

By providing external components, for example, the external components 122, 124, 162, a moving mass (i.e., the mass that has to be moved by the actuator arrangement 108) can be reduced. According to an embodiment, external components are components that are external with respect to the processing assembly 116. External components may be arranged (attached), for example, to a base of a robot arm or may also be arranged (attached) to the robot arm, in particular to a portion of the robot arm that is arranged adjacent to the base of the robot arm (for example, to one of the "lower" portions of the robot arm).

In general, it should be emphasized that while the placement of some components of the laser processing device described herein may be preferred for certain applications, within the scope of the present disclosure, the components of the laser processing device may be placed at any suitable location. For example, according to an embodiment, the diffraction arrangement 102 may be positioned remotely from the processing assembly 116, such as on a robotic arm or as an external component.

Figure 5:
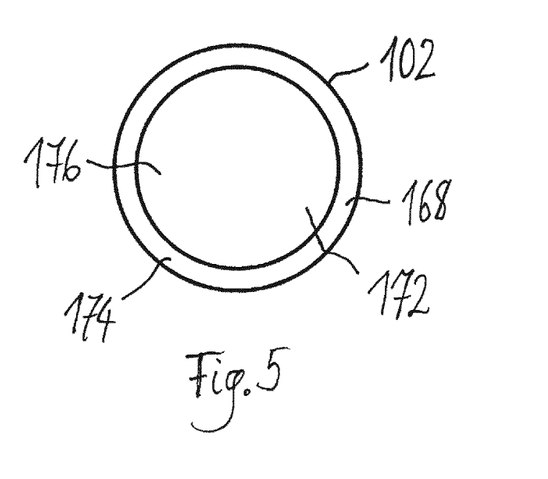
FIG. 5 shows a top view of a diffraction arrangement according to embodiments of the subject matter disclosed herein.

FIG. 5 shows a top view of a diffraction arrangement 102 according to embodiments of the subject matter disclosed herein.

According to an embodiment, the diffraction arrangement 102 comprises a diffractive optical element 168 (hereinafter also briefly referred to as optical element). According to an embodiment, the diffractive optical element 168 has a first surface 172 that includes an unstructured portion 174 and a structured portion 176. According to an embodiment, the unstructured portion 174 extends around the structured portion 176, for example as shown in FIG. 5 (thus forming a non-structured edge in an embodiment). According to an embodiment, in addition to generating the plurality of (relative) intensity maxima, the diffractive optical element also has a beam-optical (geometric optical) function, for example at least one of a focusing function, a beam-directing function, etc.

Figure 6:
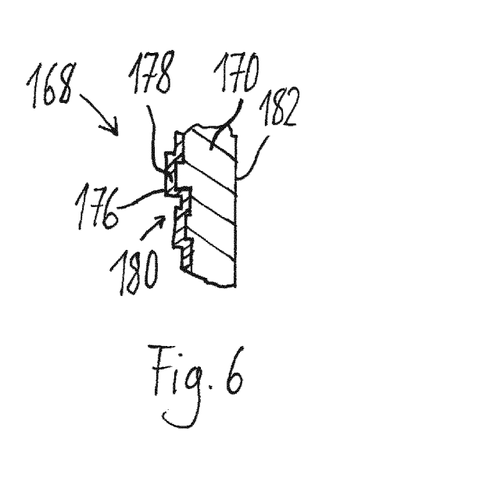
FIG. 6 shows the optical element of the diffraction arrangement of FIG. 5 in a cross-sectional view.

FIG. 6 shows the optical element 168 of the diffraction arrangement 102 of FIG. 5 in a cross-sectional view.

According to an embodiment, at least the structured portion 176 of the first surface 172 is formed by a metal, such as a coating 178. According to an embodiment, the optical element 168 comprises a body 170 and the coating 178 on the body 170. According to an embodiment, the body 170 is a patterned silicon wafer, wherein a surface structure 180 of the optical element 168 according to an embodiment is defined by the structure of the silicon wafer. It is noted that the surface structure 180 in FIG. 6 is merely exemplary and schematic to illustrate the structured surface 176 of the optical element 168 and the surface 182 facing away (averted) therefrom, and does not necessarily represent a real structuring of an optical element 168 of the diffraction arrangement 102 according to embodiments of the subject matter disclosed herein. According to an embodiment, the averted surface 182 is formed by a planar surface, such as a planar surface of the body 170, for example as shown in FIG. 6. The planar averted surface 182 may improve thermal contact with a heat exchanger, such as a heat sink. According to an embodiment, the distance between the structured surface 176 and the averted surface 182 defines the thickness of the optical element 168. According to an embodiment, the thickness of the optical element 168 is averaged over the structured surface 176 (averaged optical element thickness). According to an embodiment, the thickness of the coating 178 is less than 10% of the thickness of the body 170. Thus, according to an embodiment, the body 170 substantially defines the thickness of the optical element 168.

According to an embodiment, the surface forming the surface structure 180 may be curved or, according to another embodiment, may be planar. In other words, an initial surface, prior to the generation of the surface structure 180, may be curved or, according to another embodiment, may be planar. For example, a curvature of the initial surface may allow that a beam-optical function of the optical element 168 can be achieved.

According to an embodiment, the diffraction arrangement 102 comprises a single diffractive optical element 168, such as a diffractive optical element, for example, as illustrated with reference to FIG. 5 and FIG. 6.

It should be noted that elements or members disclosed herein (such as a control device, a laser processing device, a laser delivery device, a cooling device, an actuator arrangement, an object, etc.) are not limited to the decided entities as described in some embodiments. Rather, the elements or members disclosed herein may be implemented in various ways while still providing the disclosed specific functionality.

It is noted that each entity disclosed herein (for example, device, element, feature, and process step) is not limited to a decided entity as described in some embodiments. Rather, the subject matter described herein may be provided in different ways with different granularity at the device level or at the process level, while still providing the specified functionality. It should further be noted that according to embodiments, a separate entity may be provided for each of the functions disclosed herein. According to other embodiments, an entity may be configured to provide two or more functions as described herein. According to yet other embodiments, two or more entities may be configured to collectively provide a function as described herein.

It is noted that the implementations described herein in the drawings represent only a limited selection of possible embodiments of the subject matter disclosed herein. Thus, it is possible to combine the features of individual embodiments in a suitable manner, so that for the person skilled in the art, a plurality of different embodiments is to be considered disclosed with the embodiments made explicit herein. Furthermore, it should be mentioned that terms such as "a" or "an" do not exclude a plurality. Terms such as "comprising", "containing" or "having" do not exclude further features or process steps. The terms "comprising", "containing" or "having" each include the two meanings "comprising, inter alia" and "consisting of".

Furthermore, it should be noted that while the exemplary laser processing device and exemplary surface in the drawings show a particular combination of several embodiments of the subject matter disclosed herein, any other combination of embodiments is equally possible and is to be considered disclosed by this application.

An advantageous combination of embodiments of the subject matter disclosed herein may be summarized as follows:

A laser processing device for generating a plurality of grooves in a surface comprises an optical diffraction arrangement adapted to receive a laser radiation and to generate an output radiation hereupon, the output radiation having a plurality of intensity maxima. An actuator arrangement is provided for generating a relative movement between the output radiation and the surface, wherein each intensity maximum generates a groove of the plurality of grooves.

The invention claimed is:

1. A laser processing device for generating a plurality of grooves in a surface, the laser processing device comprising:
   an optical diffraction arrangement adapted to receive a laser radiation and to generate an output radiation hereupon, the output radiation having a plurality of intensity maxima;
   an actuator arrangement for generating a relative movement between the output radiation and the surface, wherein each intensity maximum generates a groove of the plurality of grooves; and
   a beam path adapted to direct the output radiation onto the surface;

wherein the diffraction arrangement comprises at least one optical element;

wherein the at least one optical element is adapted to generate a phase difference between a plurality of portions of the output radiation and to generate the plurality of intensity maxima in the output radiation by generating the plurality of phase differences, wherein the plurality of intensity maxima are generated by interference in the output radiation;

wherein the at least one optical element is a reflective optical element; and wherein the at least one optical element comprises a body made of metal or a semiconductor material.

2. The laser processing device according to claim 1, wherein the body is at least partially coated with a metal.

3. The laser processing device according to claim 2, wherein the body is at least partially coated with a corrosion-resistant metal.

4. The laser processing device according to claim 1, wherein the optical element is a diffractive optical element.

5. The laser processing device according to claim 1, wherein the plurality of intensity maxima comprises at least 10 intensity maxima.

6. The laser processing device according to claim 5, wherein the plurality of intensity maxima comprises at least 50 intensity maxima or at least 200 intensity maxima.

7. The laser processing device according to claim 1,
wherein the relative movement is a rectilinear movement; and the diffraction arrangement and/or the beam path are adapted such that each two grooves of the plurality of grooves form a rib therebetween.

8. The laser processing device according to claim 1, wherein the laser radiation is a CO2 laser radiation.

9. The laser processing device according to claim 1, wherein an average power of the laser radiation is at least 500 W.

10. The laser processing device according to claim 9, wherein the average power of the laser radiation is at least 1 kW.

11. The laser processing device according to claim 1, further comprising a laser source for generating the laser radiation.

12. The laser processing device according to claim 1, further comprising a coolant flow path for cooling the optical diffraction arrangement.

13. A method of generating a plurality of grooves in a surface, the method comprising:
directing a laser radiation onto an optical diffraction arrangement to generate an output radiation, the output radiation having a plurality of intensity maxima;
directing the output radiation onto the surface via a beam path; and
generating a relative movement between the output radiation and the surface, wherein each intensity maximum generates a groove of the plurality of grooves;
wherein the diffraction arrangement comprises at least one optical element;
wherein the at least one optical element is adapted to generate a phase difference between a plurality of portions of the output radiation and to generate the plurality of intensity maxima in the output radiation by generating the plurality of phase differences, wherein the plurality of intensity maxima are generated by interference in the output radiation;
wherein the at least one optical element is a reflective optical element; and
wherein the at least one optical element comprises a body made of metal or a semiconductor material.

14. The method according to claim 13, wherein generating the output radiation comprises reflecting the laser radiation at the optical diffraction arrangement.

15. The method according to claim 13, wherein the plurality of intensity maxima comprises at least 10 intensity maxima.

16. Use of a laser processing device according to the method of claim 13 for generating a plurality of parallel ribs on the surface.

* * * * *